United States Patent
Itoh

(10) Patent No.: US 7,260,582 B2
(45) Date of Patent: Aug. 21, 2007

(54) INFORMATION RECORDING APPARATUS, METHOD, INFORMATION REPRODUCTION APPARATUS, AND METHOD

(75) Inventor: Masanori Itoh, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 320 days.

(21) Appl. No.: 10/476,319

(22) PCT Filed: Nov. 20, 2002

(86) PCT No.: PCT/JP02/12092

§ 371 (c)(1),
(2), (4) Date: Oct. 27, 2003

(87) PCT Pub. No.: WO03/044798

PCT Pub. Date: May 30, 2003

(65) Prior Publication Data

US 2004/0148315 A1 Jul. 29, 2004

(30) Foreign Application Priority Data

Nov. 21, 2001 (JP) ............................. 2001-356413

(51) Int. Cl.
*G06F 17/30* (2006.01)

(52) U.S. Cl. .................. 707/102; 707/104.1; 386/33; 386/52

(58) Field of Classification Search .......... 369/30.04, 369/30.05, 83; 707/102, 104.1; 386/33, 386/52

See application file for complete search history.

(56) References Cited

U.S. PATENT DOCUMENTS

| 6,320,588 | B1 * | 11/2001 | Palmer et al. ............... 345/473 |
| 6,434,103 | B1 * | 8/2002 | Shitara et al. ................ 369/83 |
| 6,594,214 | B1 * | 7/2003 | Misaizu ................... 369/53.11 |
| 6,917,572 | B2 * | 7/2005 | Iida et al. ................ 369/47.21 |
| 2002/0012522 | A1 | 1/2002 | Kawakami et al. ........... 386/52 |
| 2002/0049730 | A1 * | 4/2002 | Ishikawa et al. ............... 707/1 |
| 2002/0057889 | A1 * | 5/2002 | Ando et al. ..................... 386/1 |
| 2002/0057891 | A1 * | 5/2002 | Shigaki ......................... 386/1 |
| 2002/0089907 | A1 * | 7/2002 | De Kimpe et al. ........ 369/47.3 |

FOREIGN PATENT DOCUMENTS

| EP | 1 126 454 | 8/2001 |
| JP | 2000-285640 | 10/2000 |

* cited by examiner

*Primary Examiner*—John Cottingham
*Assistant Examiner*—Robert M Timblin
(74) *Attorney, Agent, or Firm*—Hamre, Schumann, Mueller & Larson, P.C.

(57) ABSTRACT

An information recording or reproduction apparatus and method in which a transport packet for padding is not inserted and a limited recording space is used effectively when performing data editing to delete a mid-stream of the moving picture file consisting of an MPEG transport stream and connect the remaining portions. A data portion preceding the deleted portion, a data portion immediately after the deleted potion, and the remaining data portion are recorded as three independent data files and information on the sequence between these data files is recorded together as a management file.

16 Claims, 15 Drawing Sheets

US 7,260,582 B2

INFORMATION RECORDING APPARATUS, METHOD, INFORMATION REPRODUCTION APPARATUS, AND METHOD

TECHNICAL FIELD

The present invention relates to an information recording apparatus and method for compressing and recording, in real time, video signals and audio signals onto a recording medium such as an optical disc as well as to an information reproduction apparatus and method for expanding and reproducing the video signals and audio signals recorded on the recording medium.

BACKGROUND ART

There are system streams prescribed by the MPEG2 standard (ISO/IEC 13818-1) as methods of compressing video signals at low bit rates. As such system streams, three kinds are prescribed: Program Stream, Transport Stream and PES (Packetized Elementary Stream).

On the other hand, as recording media to be substituted for magnetic tapes, public attention has been drawn to optical discs such as phase change optical discs (for example, DVD-RAM and MVDISC) and magneto-optical discs (MO). An example of standards for video recording on DVD-RAMs is Video Recording standard (DVD Specifications for Rewritable/Re-recordable Discs Part 3 Video Recording Version 1.0 September 1999).

Further, there is also a case where a moving picture file composed of an MPEG2 transport stream prescribed by ISO/IEC 13818-1 is recorded and reproduced with respect to a phase change optical disc. In this case, video data are compressed by the MPEG2 prescribed in ISO/IEC 13818-2, and audio data are compressed, e.g., by the MPEG2-AAC (Advanced Audio Coding) prescribed in ISO/IEC 13818-7.

FIG. 6 shows a block diagram of a conventional real-time recording and reproduction apparatus 300 for a transport stream, using a phase change optical disc. In FIG. 6, when recording video signals and audio signals, signals input from a video signal input section 100 and an audio signal input section 102 are compressed by a video compression section 101 and an audio compression section 103, respectively. Thereafter, a transport stream is generated at a system encoder section 104, and is written to a phase change optical disc 131 via a recording section 120 and a pickup 130. Here, the video compression section 101, the audio compression section 103 and the system encoder section 104 constitute an MPEG encoder 170.

When reproducing the video signals and the audio signals, a transport stream taken out via the pickup 130 and a reproduction section 121 is separated by a system decoder section 114 into video signals and audio signals, which are output to a video display section 110 and an audio output section 112 via a video decoding section 111 and an audio decoding section 113, respectively. Here, the video decoding section 111, the audio decoding section 113 and the system decoder section 114 constitute an MPEG decoder 171.

When recording the video signals and the audio signals, a recording control section 161 controls the recording section 120, a contiguous data area detection section 160 and a logical block management section 163, thereby performing the recording. At this time, the contiguous data area detection section 160 checks the utilization status of sectors managed by the logical block management section 163 according to instructions from the recording control section 161, thereby detecting a physically contiguous space area. When the recording is completed, a moving picture file composed of a transport bit stream is created.

When reproducing the video signals and the audio signals, a reproduction control section 162 controls the reproduction section 121, thereby performing the reproduction.

Further, an editing control section 164 is activated when performing an editing process, e.g., of deleting a portion of the moving picture file containing the recorded video signals and audio signals.

FIG. 7 is a diagram showing a recording format in the case of real-time video recording on the phase change optical disc 131. In FIG. 7, the phase change optical disc 131 is comprised of 2 Kbyte sectors, wherein 16 sectors are treated as one logical block (32 Kbytes), and an error-correcting code is provided to each of the logical blocks for recording on the phase change optical disc 131.

Furthermore, a physically contiguous logical block having a data size corresponding to at least a predetermined time period (for example, data corresponding to 0.5 second at a maximum read-in rate) is reserved as one contiguous data area. Onto this area, Movie Object Units (hereinafter referred to as MOBUs), each of which is a unit video packet composed of an MPEG transport stream corresponding to 0.4 to 1 second, are recorded sequentially.

One MOBU is composed of transport packets that are in units of 188 bytes and are at a lower hierarchy level than the MPEG transport stream. The transport packets include four kinds: Video Transport Packet (V_TSP) for storing compressed video data; Audio Transport Packet (A_TSP) for storing compressed audio data); Program Association Table Transport Packet (PAT_TSP); and Program Map Table Transport Packet (PMT_TSP).

Further, one MOBU contains all the V_TSPs for a corresponding time. Moreover, one MOBU contains all the A_TSPs containing audio frames that are needed in timing for fulfilling a T-STD (Transport Stream System Target Decoder). That is to say, the audio frames are completed in the MOBU. Further, if the video is of a variable bit rate, the data size of one MOBU varies in a range not higher than a maximum recording/reproduction rate. On the other hand, if the video is of a fixed bit rate, the data size of the MOBU is substantially constant.

FIG. 8 is a diagram showing details of the V_TSP, the A_TSP, the PAT_TSP and the PMT_TSP. As shown in FIG. 8, the V_TSP is composed of a transport packet header and video data. The A_TSP is composed of a transport packet header and audio data. The PAT_TSP is composed mainly of a transport packet header and a program association table. The PMT_TSP is composed mainly of a transport packet header and a program map table.

The four elements, V_TSP, A_TSP, PAT_TSP and PMT_TSP, are identified by PIDs (Packet IDs) in the transport packet headers. For example, as shown in FIG. 8, the V_TSP, the A_TSP, the PAT_TSP and the PMT_TSP are identified by detecting PID="0x0020", PID="0x0021", PID="1x0000" and PID="0x0030", respectively.

Here, the PID allocation statuses for the V_TSP and the A_TSP are recorded in the program map table in the PMT_TSP. Besides, the PID for the PAT_TSP has a fixed value of "1x0000".

At the time a residual portion of one contiguous data area becomes small, the contiguous data area detection section 160 shown in FIG. 6 detects a subsequent contiguous data area again. When the one contiguous data area becomes full, the writing to the subsequent data area is performed.

Further, FIG. 9 shows an example of a state where recorded contents on an optical disc are managed by a FAT (File Allocation Table) file system. Here, the cluster of the FAT file system corresponds to the logical block of FIG. 7, and its data size is assumed to be 32 Kbytes. FIG. 9 shows the case in which one MPEG transport stream is recorded, as a moving picture file "movie000.m2t", by one operation of a record starting button for each ON and OFF.

As shown in FIG. 9, a file name and a starting cluster number of the data in the file are stored in a directory entry. Further, the FAT manages, in units of clusters, storage addresses of the data in the file. For example, an address in the FAT corresponding to one cluster number holds a cluster number of the next storage address. By such directory entry and FAT, one file and three contiguous data areas a, h and c constituting the file are managed. Note here that the name portion (m2t) of the extension in the file name shown in FIG. 9 and the other name portion (movie 000) are recorded in separate fields in the directory entry, but are not distinguished for simplifying the description.

Furthermore, the data size of each contiguous data area a and b needs to be an integral multiple of the data size (32 Kbytes) of one logical block (cluster). Besides, the data size of the contiguous data area c may be an arbitrary data size.

The process in which the contiguous data area is separated into three pieces as above will be described. Firstly, when the recording control section 161 finds a defective logical block during recording onto the contiguous data area a, it skips such defective logical block, and continues the writing process from the head of the contiguous data area b.

Further, when the recording control section 161 detects, during recording onto the contiguous data area b, that a need of recording onto a record area of a PC file has arisen, it skips the record area of the PC file this time, and continues the writing process from the head of the contiguous data area c. As a result, the file "movie000.m2t" is constituted by the three contiguous data areas a, b and c.

FIG. 10 is a diagram showing a data structure of a video file after editing. As shown in FIG. 10, in the case where a mid-stream of the file is deleted, the file, after editing, is constituted by a data stream A positioned before the deleted portion, a data stream B positioned after the deleted portion, and padding. The data size of the padding is 1.504 Mbytes at maximum (752 Kbytes on average). This maximum value is the least common multiple of 188 bytes, which is the data size of the transport packet, and 32 Kbytes, which is the data size of the logical block.

Here, the padding was assumed to be of null transport packets (packets of PID=1FFFh), but may also be packets having other PIDs.

As shown in FIG. 10, in the case where a mid-stream of a moving picture file is partially deleted, and the remaining portions are combined into one as one moving picture file, a prior art method has a problem that the amount of padding becomes very large when attempting to maintain continuity of packets constituting the file.

DISCLOSURE OF THE INVENTION

The present invention thus has been made in view of the above-described problem, and its object is to provide an information recording apparatus and method, and an information reproduction apparatus and method, such that in the case where a mid-stream of a file is deleted, with the remaining portions being combined, insertion of a large amount of packets for padding is unnecessary for maintaining continuity of the packets constituting the file, whereby a remaining limited recording space can be utilized effectively.

For achieving the above object, an information recording apparatus according to the present invention includes a recording control section for recording, in a packet format of a fixed length different from a data size of a logical block of a recording medium, an input data stream onto the logical block, wherein the recording control section: first terminates the data stream at an arbitrary position; records, as separate data files, a data stream preceding the termination point and a data stream immediately following the termination point; and records information on the relation between the data files.

In the information recording apparatus according to the present invention, the information on the relation is information on a sequence between the data files.

According to the above-described configuration, insertion of transport packets for padding becomes completely unnecessary. Thereby, it becomes possible to utilize a limited recording space effectively.

Further, in the information recording apparatus according to the present invention, the position of the termination of the data stream is characterized by being a significant discontinuity point of the data stream.

According to such configuration, when accessing a significant continuity portion of a data stream, it easily can be computed in which logical block data are contained.

For achieving the above-described object, an information reproduction apparatus according to the present invention includes a reproduction control section for subjecting a plurality of divided data files, which are created by dividing a data file configured in a packet format of a fixed length different from a data size of a logical block of a recording medium, to the same reproduction process as that to which the data file before division is subjected, with reference to information on the relation between the plurality of divided data files that are separately recorded.

According to such a configuration, it becomes possible to access transport streams in divided files in a manner similar to a case of storing a transport stream in one file.

For achieving the above-described object, an information recording method according to the present invention includes the steps of: first terminating an input data stream at an arbitrary position; recording, in a packet format of a fixed length different from a data size of a logical block of a recording medium, a data stream preceding the termination point and a data stream immediately following the termination point as separate data files onto the logical blocks; and recording information on the relation between the data files.

In the information recording method according to the present invention, the information on the relation is information on a sequence between the data files.

According to the above-described method, insertion of transport packets for padding becomes completely unnecessary. Thereby, it becomes possible to utilize a limited recording space effectively.

Further, in the information recording method according to the present invention, the position of the termination of the data stream is a significant discontinuity point of the data stream.

According to such a configuration, when accessing a significant continuity portion of a data stream, it easily can be computed in which logical block data are contained.

For achieving the above-described object, an information reproduction method according to the present invention includes the steps of: creating a plurality of divided data files by dividing a data file configured in a packet format of a fixed length different from a data size of a logical block of a recording medium; and subjecting the plurality of divided data files to the same reproduction process as that to which the data file before division is subjected, with reference to information on the relation between the plurality of divided data files that are separately recorded.

According to such a method, it becomes possible to access transport streams in divided files in a manner similar to a case of storing a transport stream in one file.

BEST MODE FOR CARRYING OUT THE INVENTION

Hereinafter, embodiments of the present invention will be described with reference to the drawings.

EMBODIMENT 1

Figure 1:
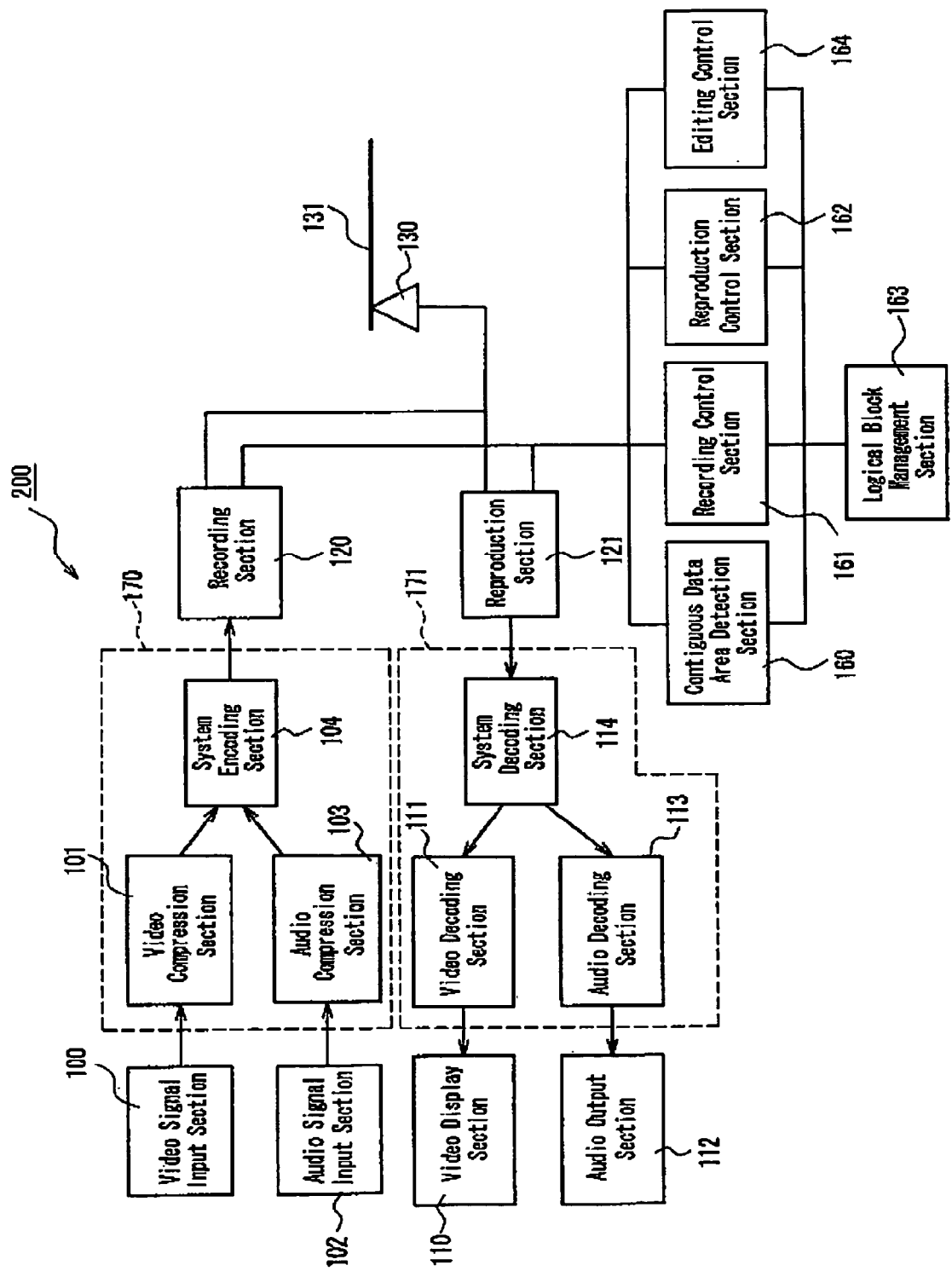
FIG. 1 is a block diagram showing a functional configuration of an information recording and reproduction apparatus according to Embodiment 1 of the present invention.
Figure 6:
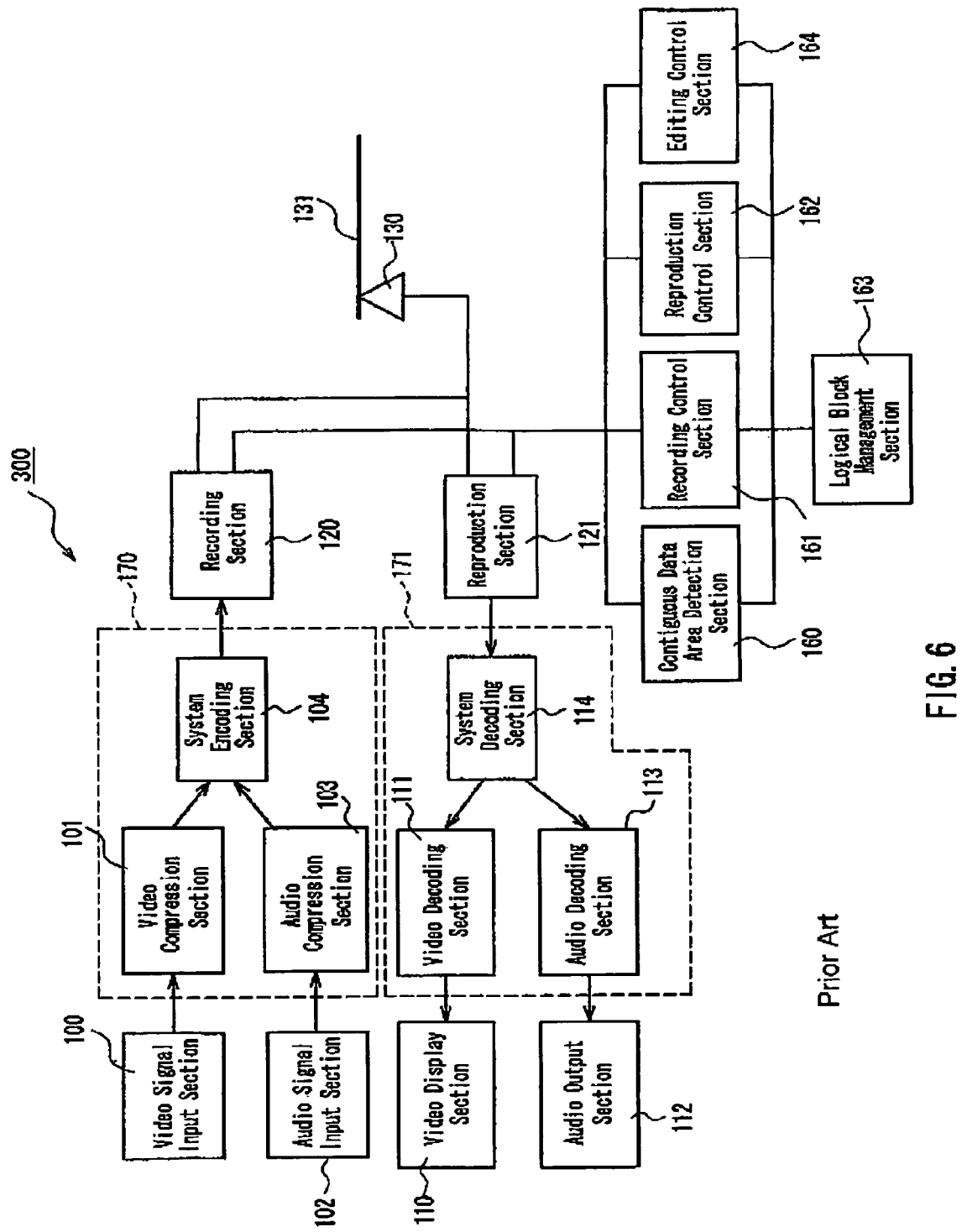
FIG. 6 is a block diagram showing a functional configuration of a conventional information recording and reproduction apparatus.
Figure 7:
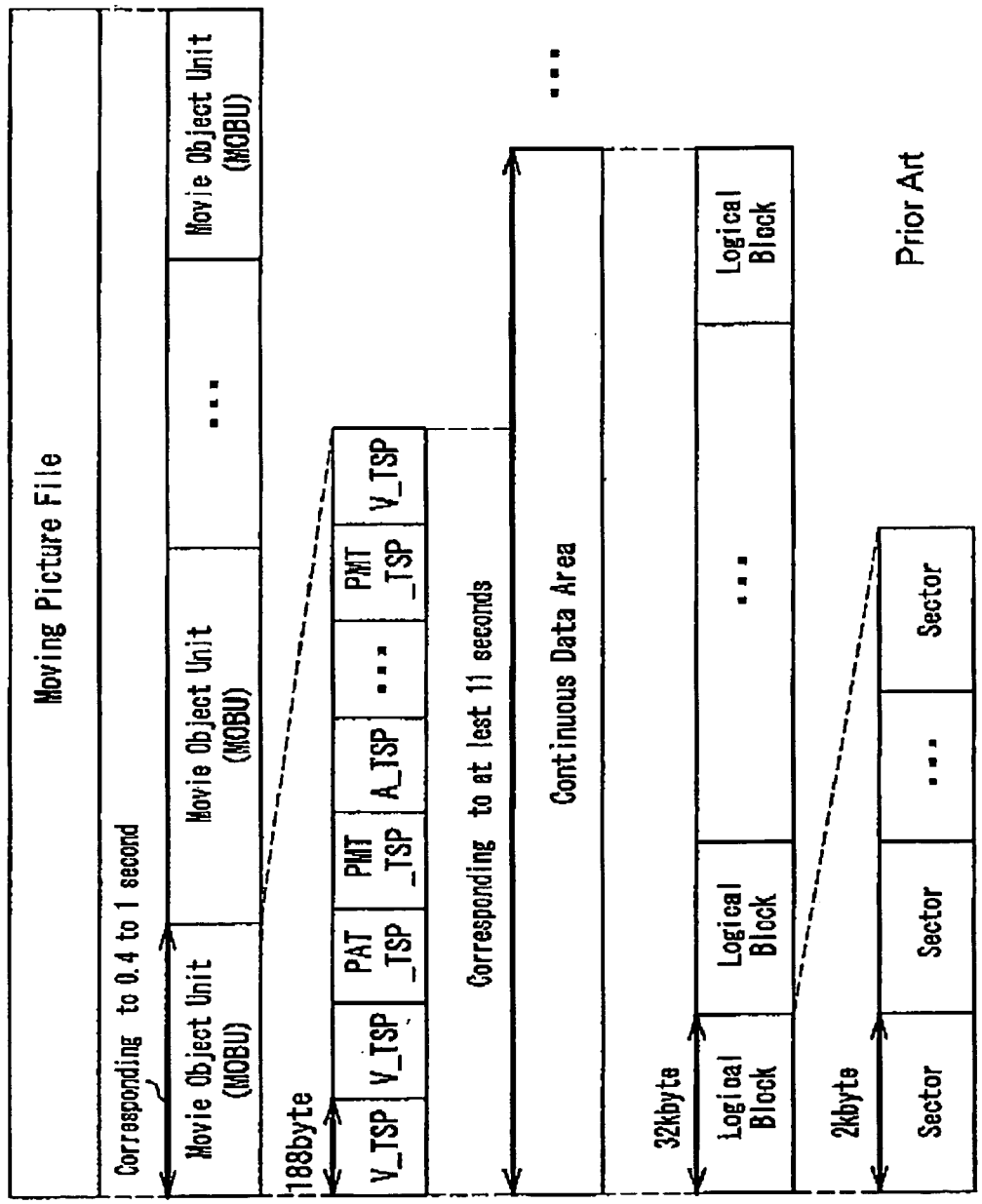
FIG. 7 is a diagram showing a recording format in the case of recording a moving picture file in real time on a phase change optical disc.
Figure 8:
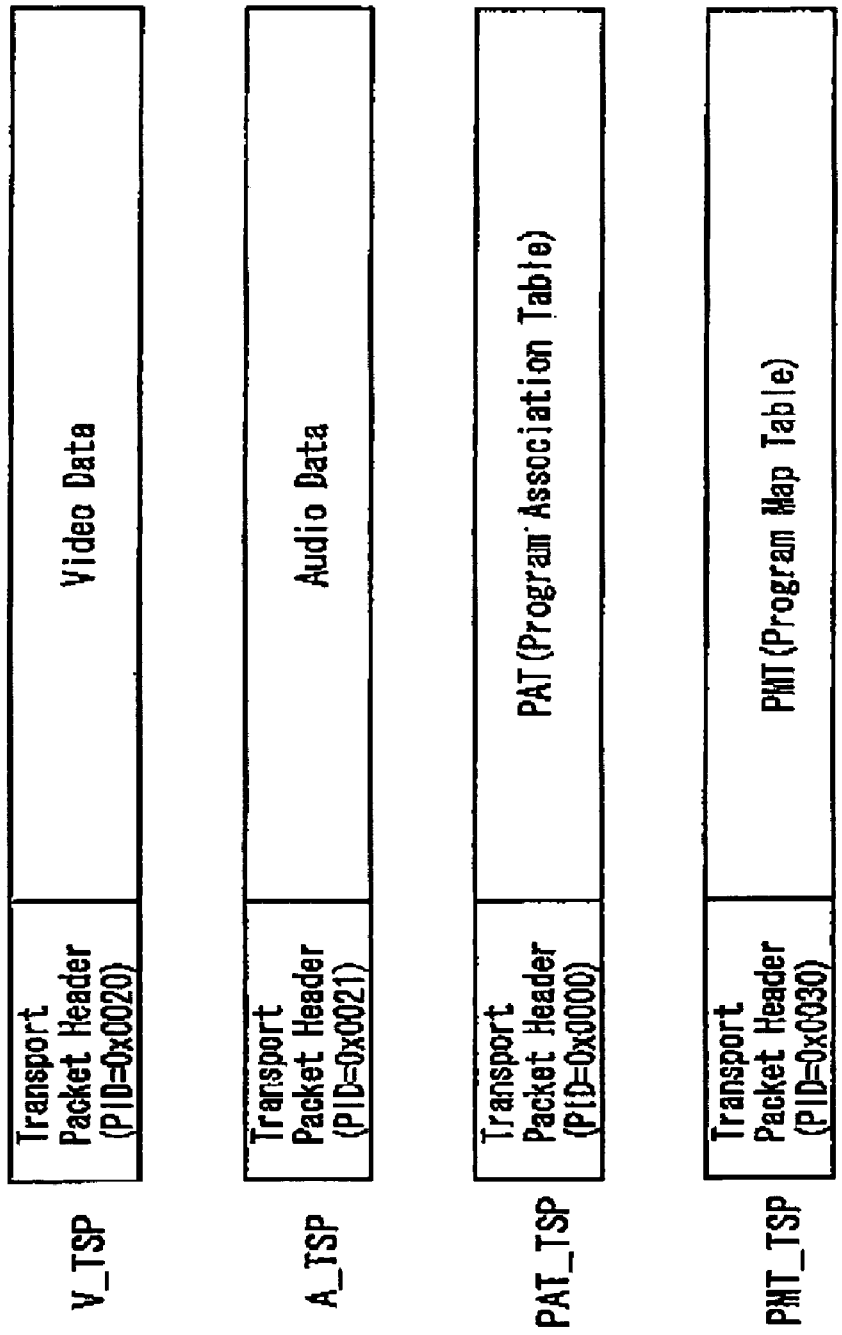
FIG. 8 is a diagram showing data structures of transport packets.
Figure 9:
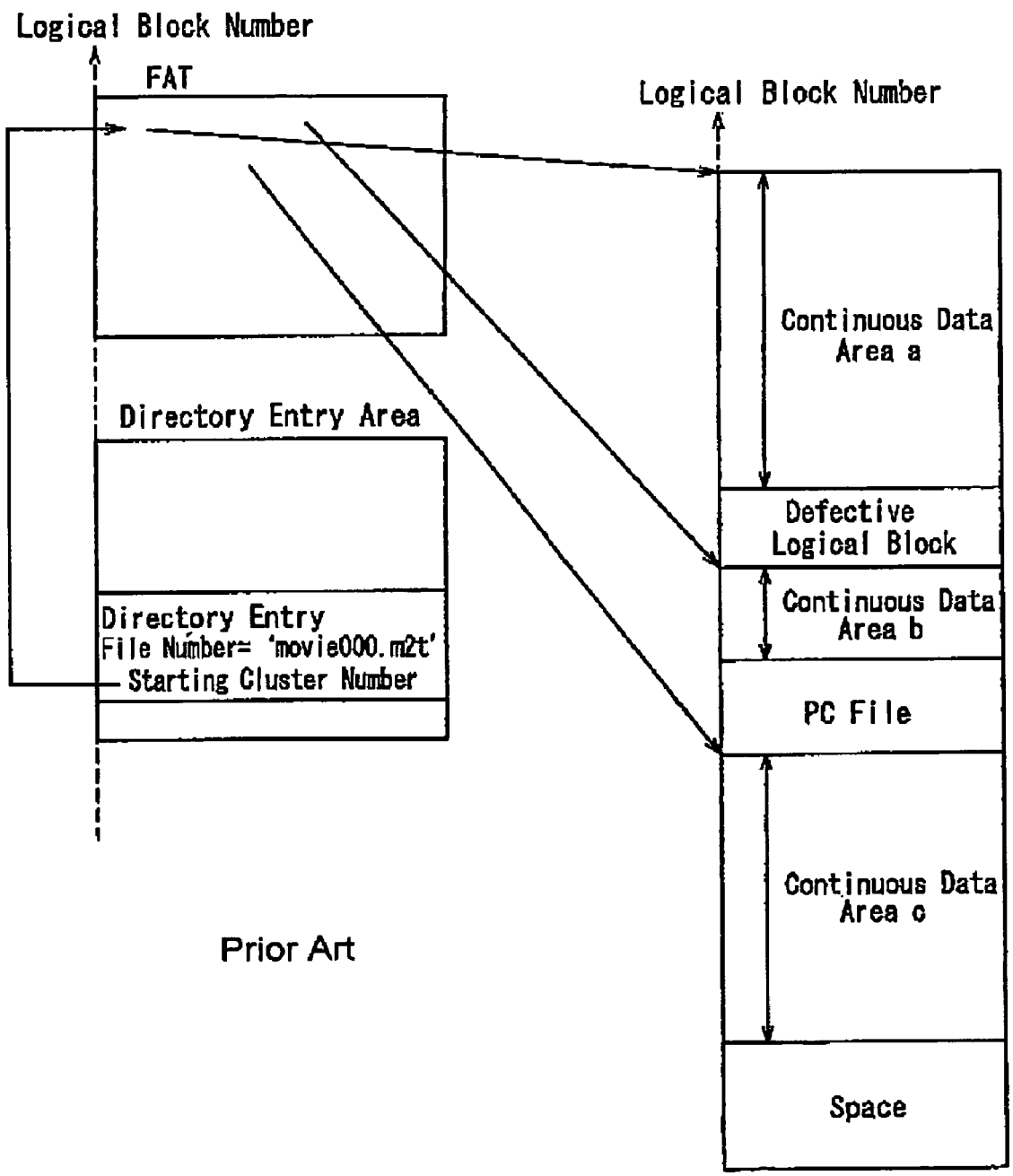
FIG. 9 is a data structure chart showing a state where the moving picture file is managed by a FAT file system.

FIG. 1 is a block diagram showing a configuration of an information recording and reproduction apparatus 200 according to Embodiment 1 of the present invention. The present Embodiment differs from the prior art shown in FIG. 6 in the contents of process of the editing control section 164', as described herein below with reference to FIGS. 2, 3, and 11-13. The configurations and functions of other sections are the same as in the conventional ones, so that the same reference numerals are provided, thereby omitting descriptions thereof.

Figure 2:
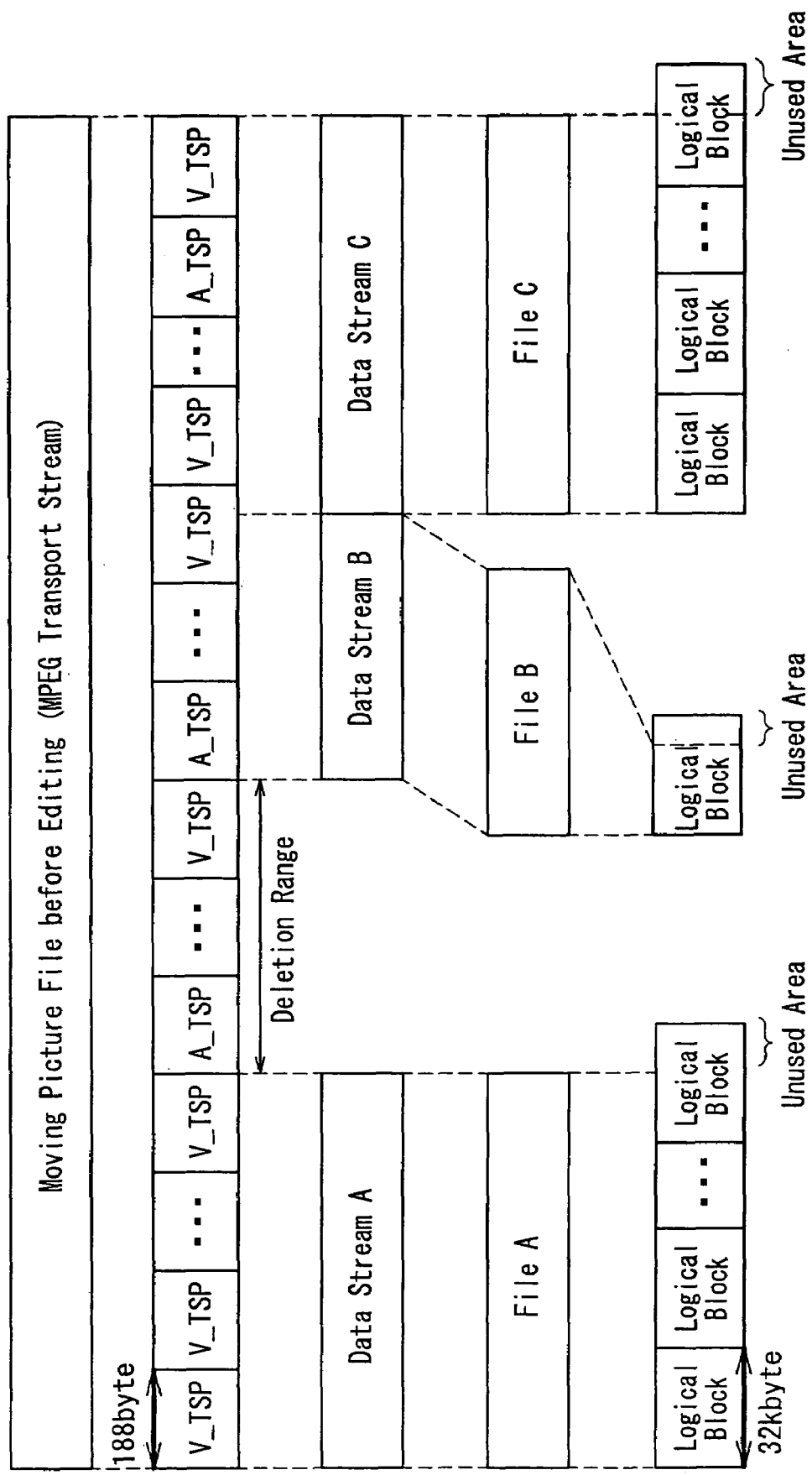
FIG. 2 is a diagram showing a data structure of a moving picture file after editing in the information recording and reproduction apparatus according to Embodiment 1 of the present invention.

FIG. 2 is a diagram showing a data structure of a moving picture file after editing according to the present Embodiment. Note here that a moving picture file before editing in FIG. 2 is assumed to be composed of MOBUs similar to the conventional ones. In FIG. 2 as well, a data stream A indicates a portion preceding a deleted portion, and data streams B and C indicate portions after the deleted portion. The head data of the data stream C is the head data of the first logical block immediately after the deleted portion. Accordingly, the data size of the data stream B is not larger than 32 Kbytes. The data streams A, B and C constitute files A, B and C, respectively. The data of the data stream B constitutes the file B by packing the data forward in the logical block where the data is stored.

Figure 3:
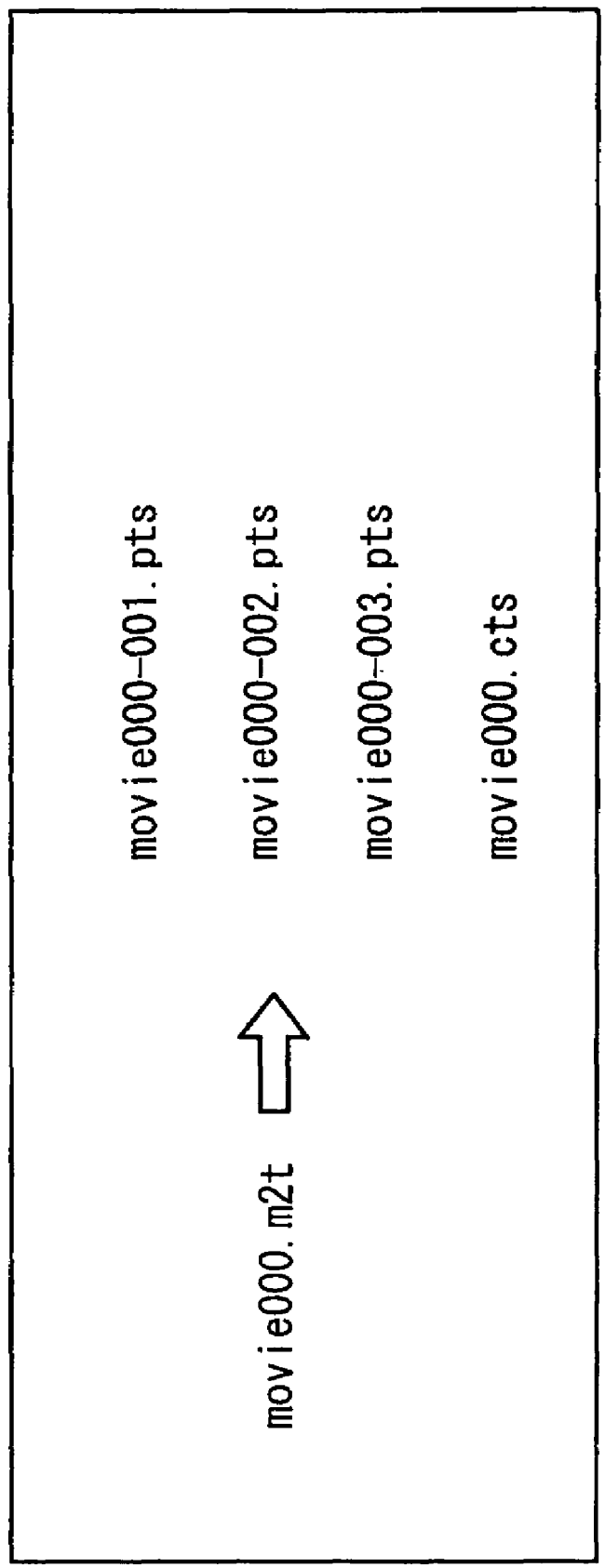
FIG. 3 is a diagram showing a file configuration after editing in the information recording and reproduction apparatus according to Embodiment 1 of the present invention.

FIG. 3 is a diagram showing a file configuration after editing in the present Embodiment. Referring to FIG. 3, the moving picture file having had a file name "movie000.m2t" before editing is made to be recorded as one combined data stream in the format of three divided files "movie000-001.pts", "movie000-002.pts" and "movie000-003.pts" by performing the partial deletion as shown in FIG. 2. The "movie000.cts" is a management file for managing the relation between the three files, and therein the file names and the sequence of the three files to compose the data stream are recorded.

In the case where a mid-stream of a recorded picture file is deleted by such process as described above, it becomes completely unnecessary to insert padding in one data stream composed of three divided files. In other words, it becomes completely unnecessary to insert padding in the data stream of each file.

In the case of reproducing the moving picture file after editing, the reproduction control section 162 subjects the three divided files, with reference to the management file "movie000.cts", to a reproduction process similar to that for the file "movie000.m2t" before editing, whereby the videos and audios can be reproduced. For example, in the case where a tail portion of "movie000.m2t" stores display time information of the stream together therein, it is possible to find out, with reference to the file name and the data size of the divided file in the management file "movie000.cts", which byte of which divided file starts storing it, and to read out the targeted display time information. Other reproduction processes and editing processes are done similarly.

Figure 11:
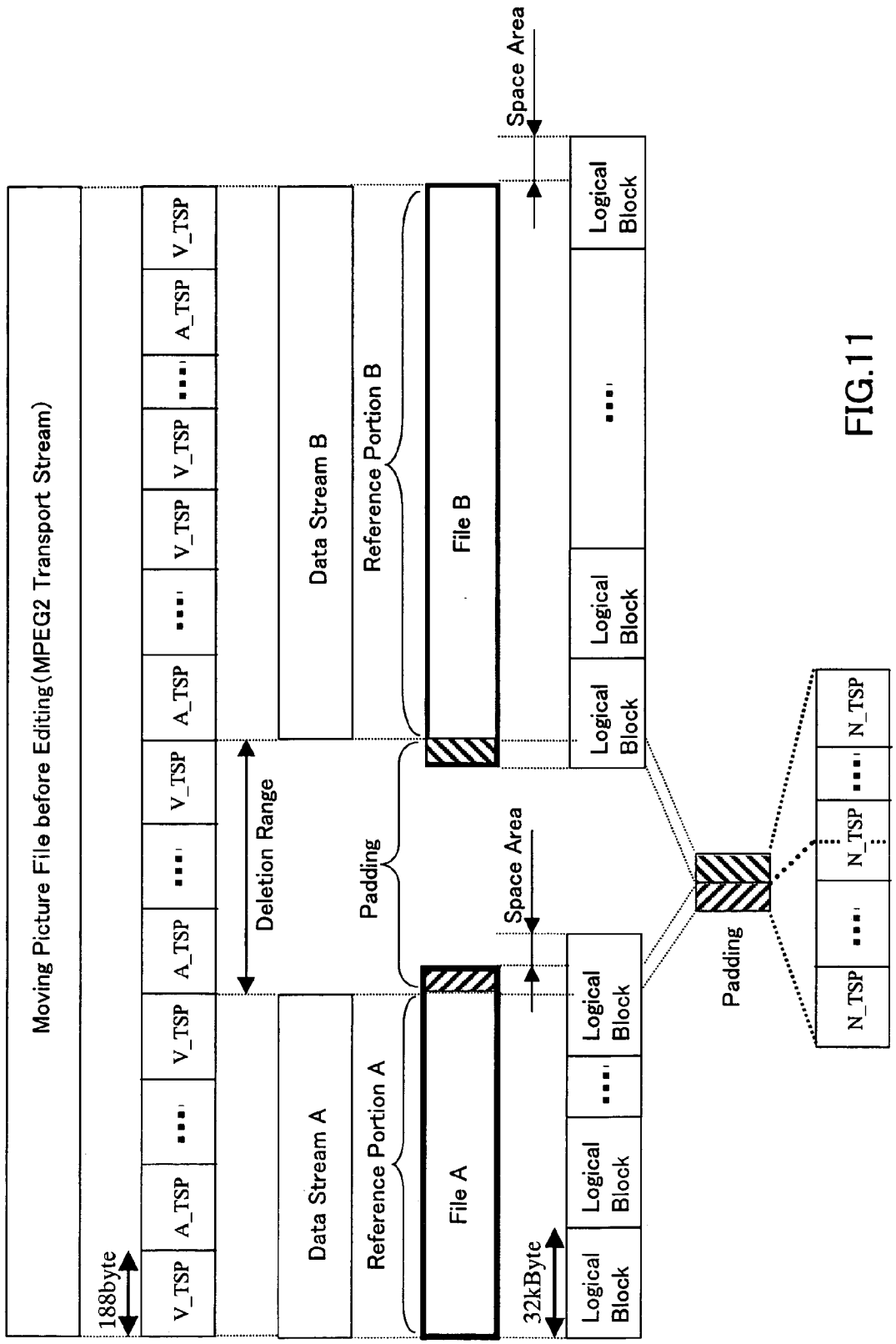
FIG. 11 is a diagram showing a data configuration of a moving picture file after a further editing in the information recording and reproduction apparatus according to Embodiment 1 of the present invention.
Figure 12:
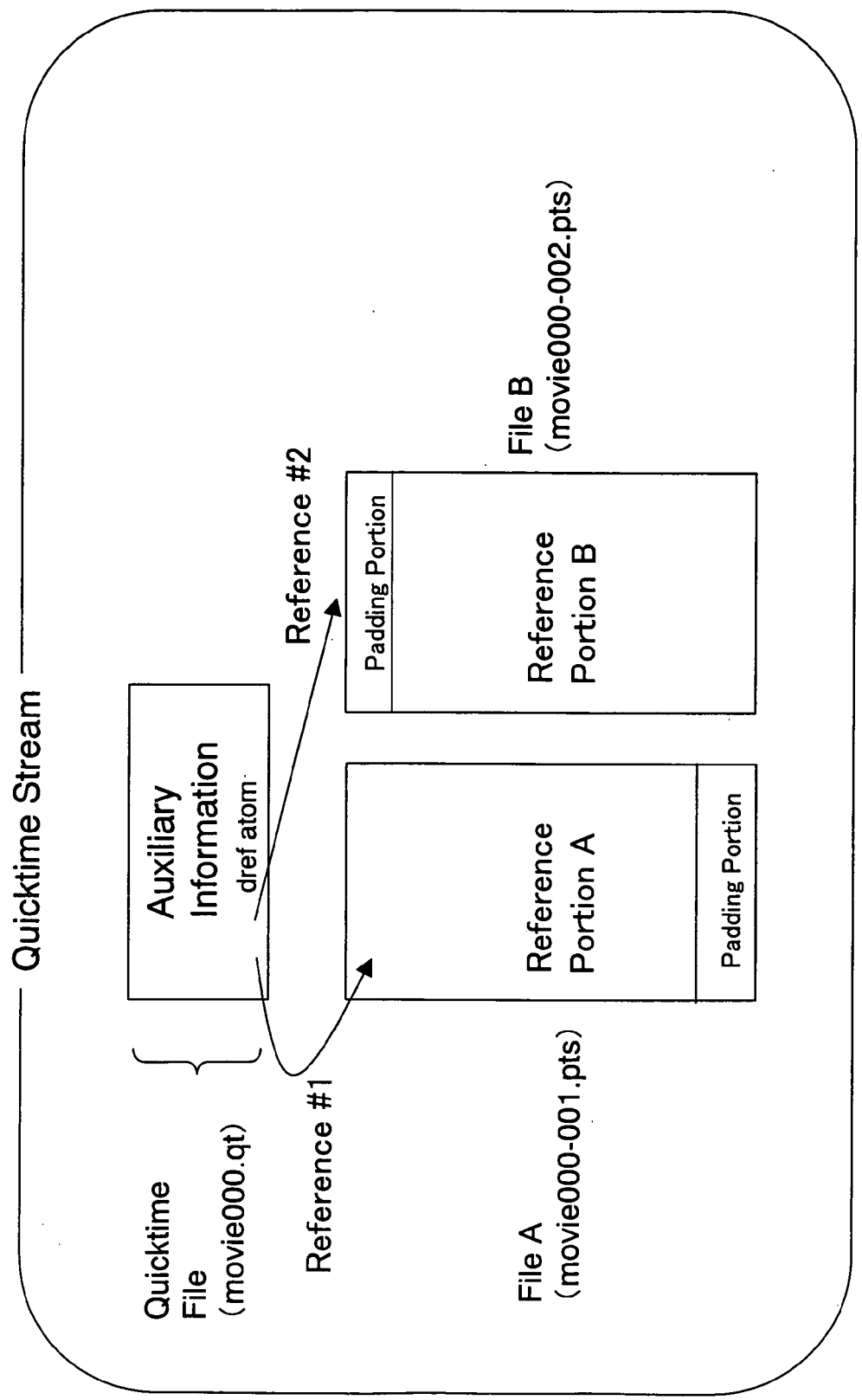
FIG. 12 is a diagram showing a file configuration after the further editing in the information recording and reproduction apparatus according to Embodiment 1 of the present invention.

Note here that in the present Embodiment, the division into the three files was made, but division into two files as shown in FIG. 11 may be made as well. In such case, no unused area in the logical block is generated in mid-stream of the stream B in FIG. 11, so that it becomes easier to grasp (easier to compute) the relation between the stream and the logical block, compared with the case in FIG. 2.

Besides, in FIG. 11, the dividing position of the file corresponds to a discontinuity point (significant discontinuity point) of the transport stream after editing. Specifically, such discontinuity point becomes a position where the continuity of values of PCR/PTS/DTS or the like and the continuity of protocol of buffer occupation amount of T-STD cannot be fulfilled. This discontinuity point corresponds to the padding data, and furthermore coincides with the dividing position of the file.

In this case, the relation of the two files may be managed by a movie000.cts file similarly as in FIG. 3. However, the relation may also be managed in another way as in FIG. 12. In other words, the two files may be managed as one combined moving picture data, using dref atom of Quicktime format. The Quicktime file "movie000.qt" of FIG. 12 holds, in the dref atom, the file names "movie000-001.pts" and "movie000-002.pts" of the respective files containing the data stream A portion and the data stream B portion of FIG. 11. Further, the movie000.qt file also holds a starting address and an ending address of reference portion A in movie000-001.pts or reference portion B in movie000-002.pts.

Figure 10:
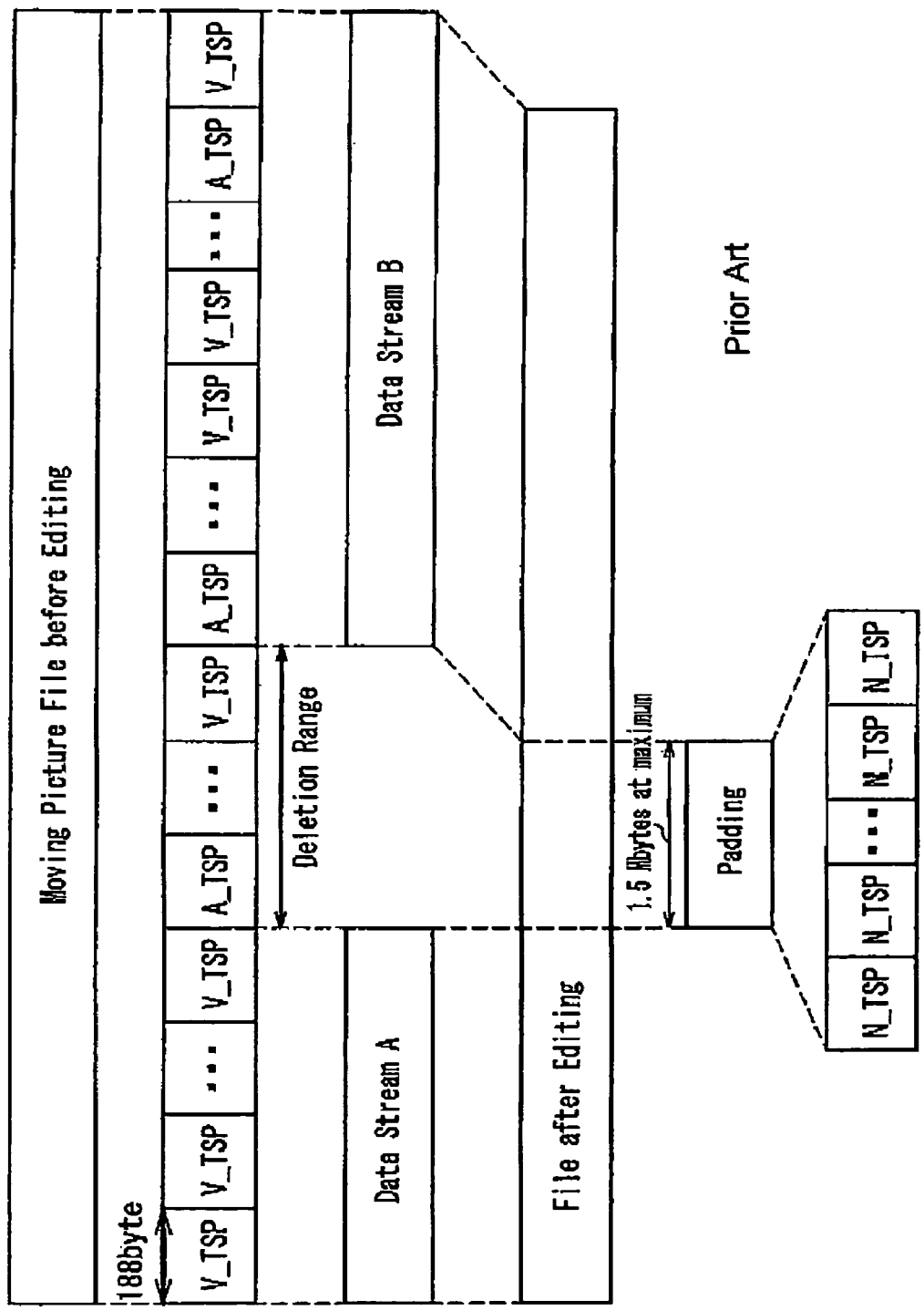
FIG. 10 is a diagram showing a data structure of a moving picture file after editing in the conventional information recording and reproduction apparatus.

The data stream B following the data stream A fulfills the continuity of the transport packet, so that the system decoder section can perform a decoding process similarly as for the file edited in a conventional manner shown in FIG. 10.

Figure 13:
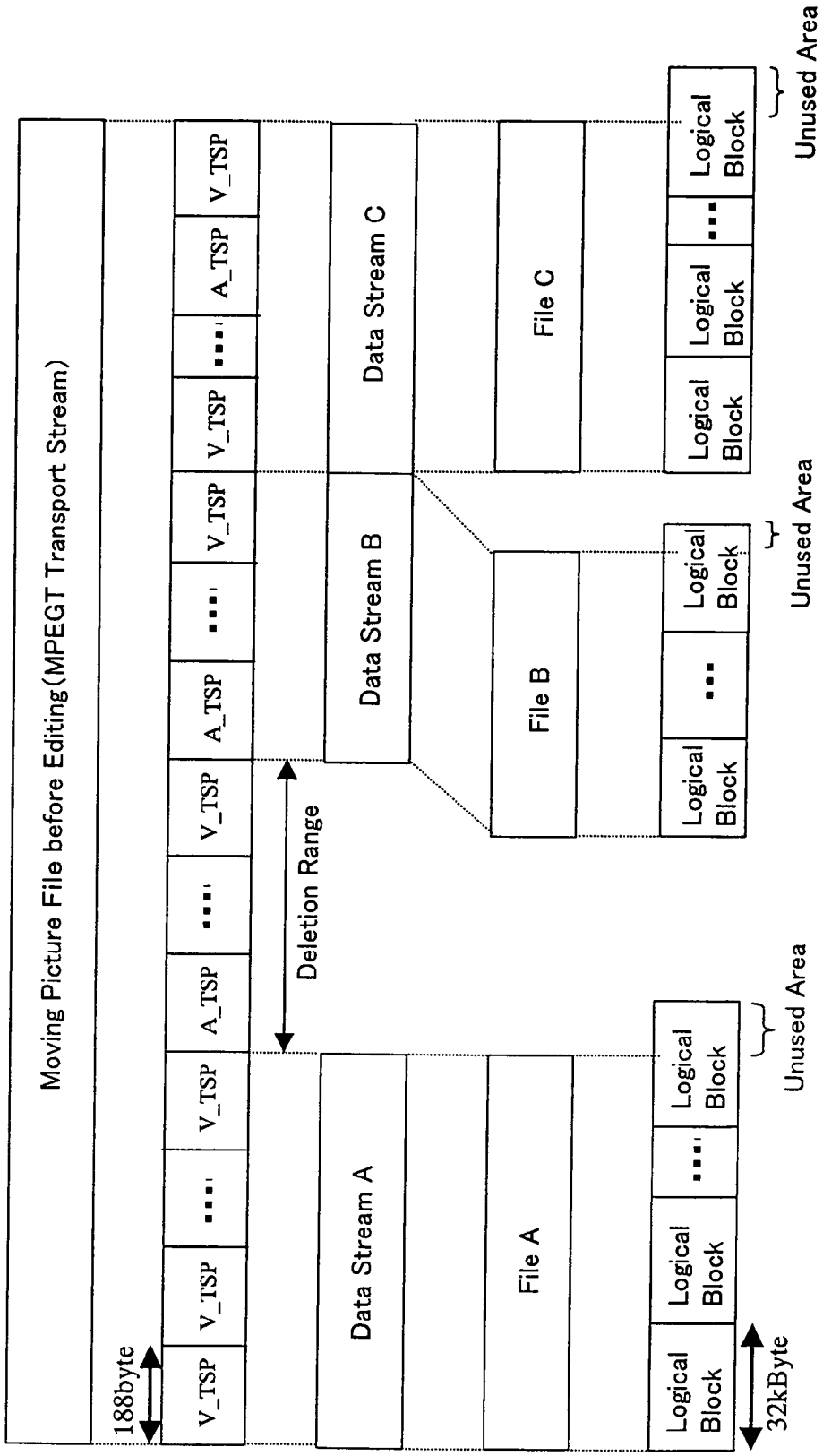
FIG. 13 is a diagram showing a data structure of a moving picture file after another editing in the information recording and reproduction apparatus according to Embodiment 1 of the present invention.

Note here that the file B in the present Embodiment 1 was assumed to be not larger than 32 Kbytes, but may occupy a plurality of logical blocks as shown in FIG. 13. In FIG. 13, the head of the file C coincides with the head of the transport packet. In other words, it is also possible to allow the head of each file to coincide with the head of the transport packet. Hereat, it is to be provided that the data size of the file B be a little less than 1.5 Mbytes.

According to the present Embodiment 1, the contiguous MPEG stream is divided into the file B and the file C after editing. However, the continuity of parameters including time stamp for the MPEG stream is to be managed as a management data for the stream.

EMBODIMENT 2

Embodiment 2 differs from Embodiment 1 as to where the three files and the management file after editing are placed in the directory hierarchy. Other configurations are the same as in Embodiment 1.

Figure 4:
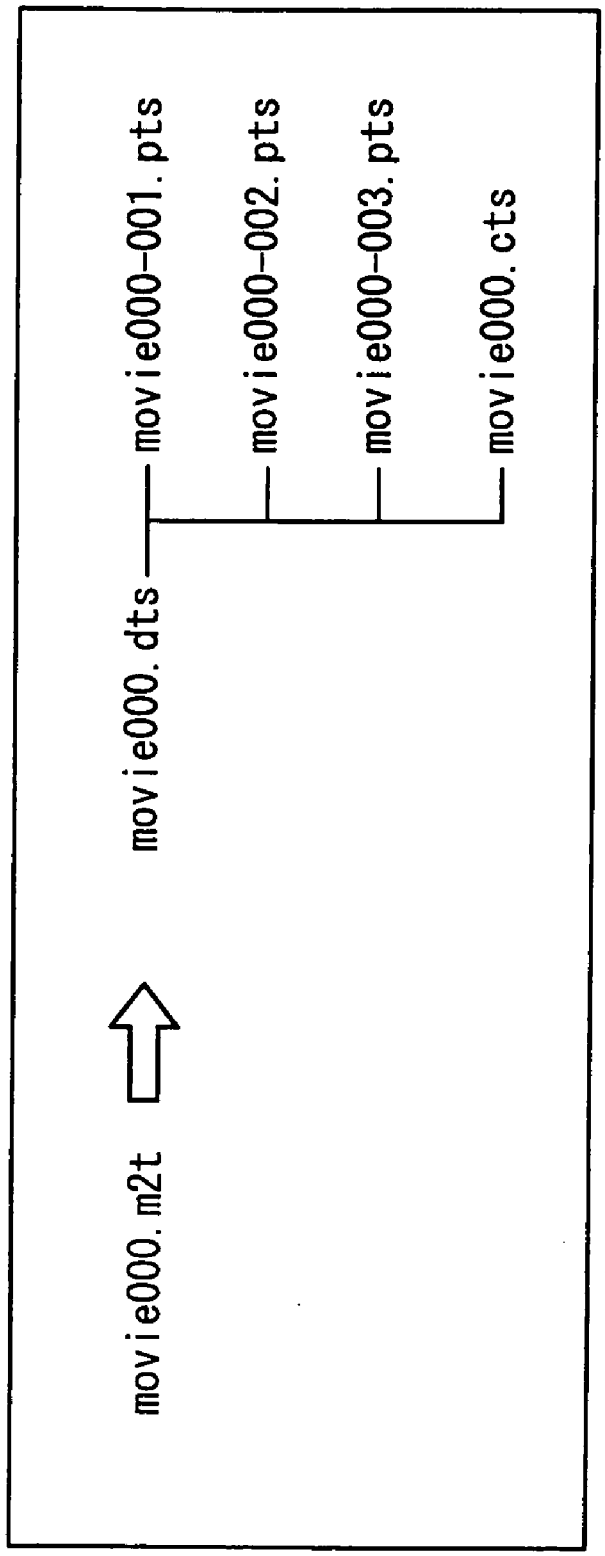
FIG. 4 is a diagram showing a file configuration after editing in an information recording and reproduction apparatus according to Embodiment 2 of the present invention.

FIG. 4 is a diagram showing a file configuration after editing according to the present Embodiment. Referring to FIG. 4, the file configuration according to the present Embodiment differs from that of Embodiment 1 shown in FIG. 3 in that the four files, "movie000-01.pts", "movie000-02.pts", "movie000-03.pts" and "movie000.cts", are placed below one directory "movie000.dts".

Figure 5:
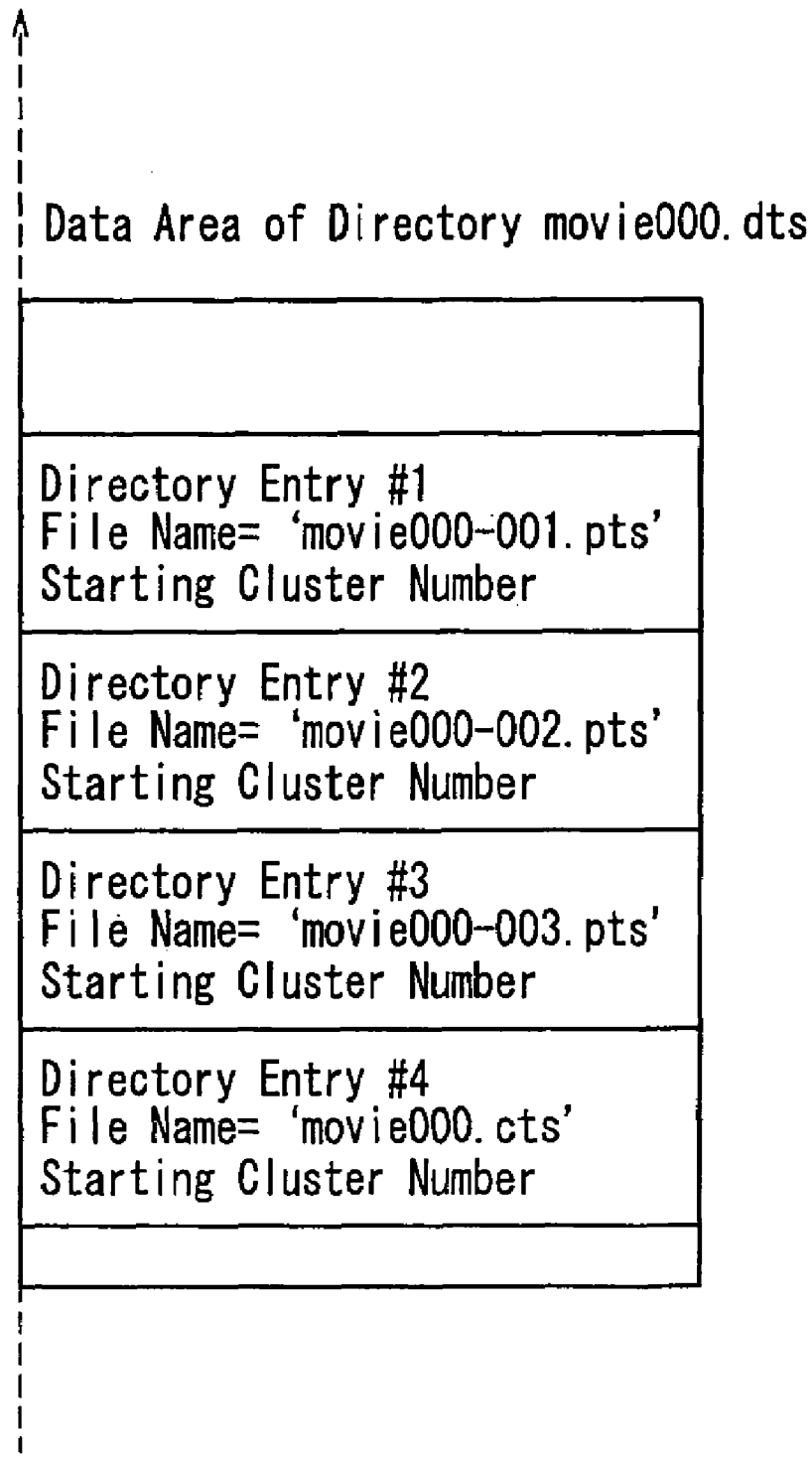
FIG. 5 is a diagram showing a data structure of a data area of a directory in the information recording and reproduction apparatus according to Embodiment 2 of the present invention.

FIG. 5 is a diagram showing a data structure of a data area of directory "movie000.dts" in the present Embodiment. As shown in FIG. 5, directory entries #1, #2, #3 and #4 are recorded sequentially in correspondence with the four files, "movie000-01.pts", "movie000-02.pts", "movie000-03.pts" and "movie000.cts" below the directory "movie000.dts", respectively.

In the case where the editing control section 164', deletes a mid-steam of the moving picture file, as shown in FIG. 4, the configuration by the directory "movie000.dts" and the four files below the directory makes it completely unnecessary to insert padding in the data stream.

According to the present Embodiment, the directory entries for the four files in the directory "movie000.dts" are recorded in accordance with the sequence thereof in configuration of the data stream as in FIG. 5, whereby it becomes possible to perform the reproduction in accordance with the recorded sequence of the directory entries. There-fore, a stronger apparatus can be configured, such that even if a file name is erroneously modified by a user, the reproduction is not influenced thereby at all. At the same time, it has an advantage that file names can be allocated freely.

EMBODIMENT 3

A case of recording an MPEG program stream on a FAT file system, in which the moving picture file is conformed to the DVD-Video Recording standard, will be described as Embodiment 3 of the present invention.

Figure 14:
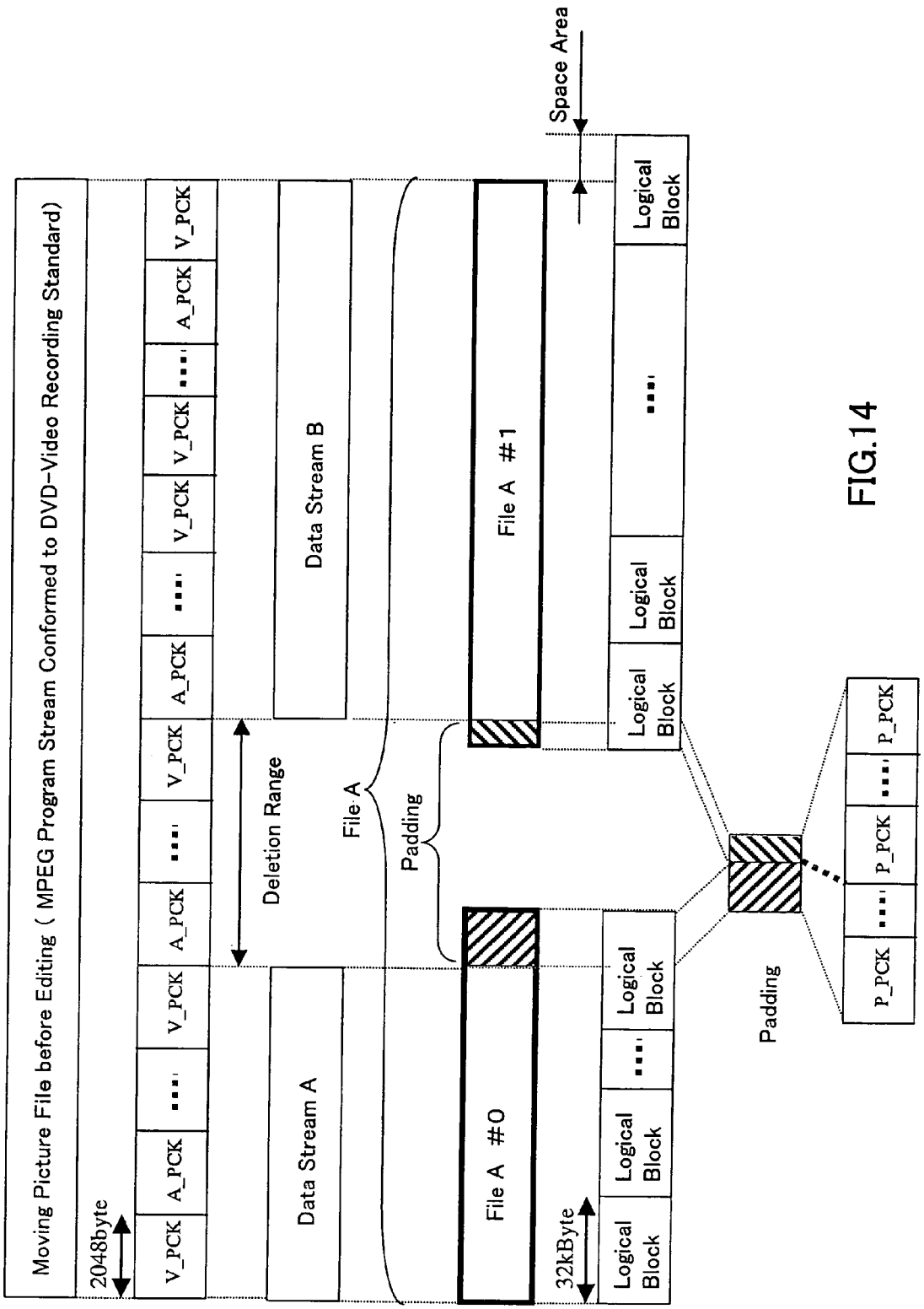
FIG. 14 is a diagram showing a data structure of a moving picture file after editing in an information recording and reproduction apparatus according to Embodiment 3 of the present invention.

FIG. 14 is a diagram showing a data structure, after editing, of an MPEG program stream in which the moving picture file is conformed to the DVD-Video Recording standard. Each packet is composed of 2,048 bytes, wherein V_PCK contains video data, and A_PCK contains audio data. In the case where a mid-stream of a file is deleted, P_PCKs (padding packs) are recorded on a portion preceding the deleted portion as well as on a portion following the deleted portion.

Figure 15:
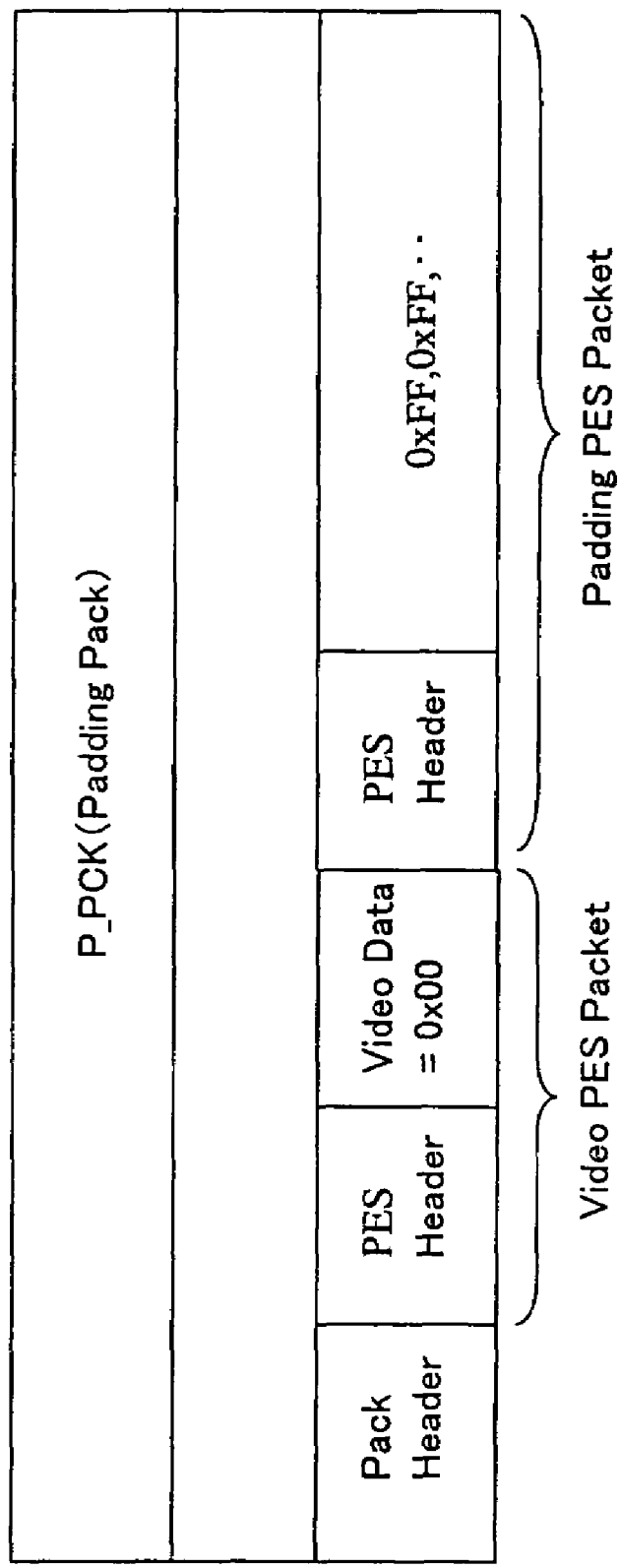
FIG. 15 is a diagram showing a data structure of a padding pack in the information recording and reproduction apparatus according to Embodiment 3 of the present invention.

FIG. 15 is a diagram showing a data structure of the P_PCK. The data structure of FIG. 15 is a data structure equivalent to the V_PCK in which 1 byte (value of 0) of video data in a video PES packet is recorded, with the remaining being composed of a padding PES packet. The reason for using V_PCK is because the DVD-Video Recording standard does not permit PES packets having a unique identifier.

The configuration manner of FIG. 14 makes it possible to edit the data stream A and the data stream B easily as one file conformed to the DVD-Video Recording standard.

Note here that in FIG. 15, 1 byte of video data was recorded, but it is also possible to record none at all. Further, it is also possible to record two or more of 0x00. Furthermore, V_PCK may be replaced by A_PCK. However, such case is to be limited to the case where the audio decoder neglects 0x00, if any, existing between respective audio frames.

It is to be noted that in Embodiments 1 and 2, the partial deletion caused the division into three files, but it may also be of two files by merging the first one with the second one. Thereby, it becomes possible to reduce, to about two thirds, an unused portion of the logical block containing data at the file tail.

Further, in Embodiments 1 and 2, the name of the file, after being divided, was assumed to have 16 characters such as in "movie000-001.pts", but may also be 12 characters such as "m000-001.pts", if it can be distinguished from the name "movie000.m2t" of the file before being divided. Besides, it is needless to say that it may be of other numbers of characters.

Further, in Embodiments 1 and 2, the moving picture file, before editing, was assumed to be a transport stream. However, the transport stream may be constituted by three portions, a file header portion; a file body portion; and a file footer portion, in the sense of information contained in the transport stream. For example, it is possible to store only attribute information of the file body portion in the file header portion and the file footer portion.

Furthermore, in Embodiments 1 and 2, the moving picture file, before editing, was assumed to be a transport stream constituted by 188 byte packets, but may also be a data stream constituted by 192 byte packets. For example, in the case of transport packets to be transmitted using an IEEE 1394 interface, one unit is 192 bytes composed of 188 bytes and timing information of 4 bytes added thereto. There are cases where such data streams are recorded. Besides, needless to say, they may be data streams constituted by packets having data sizes other than 188 bytes. This is effective in the case, in particular, where the data size of the logical block and the data size of the packet are not in an integral multiple relationship.

Further, in each Embodiment, the data size of the logical block was assumed to be 32 Kbytes, but also may be treated as 2 Kbytes by using a UDF (Universal Disk Format) file system. The present invention is effective in this case as well, because padding of 94 Kbytes (which is the least common multiple of 188 bytes and 2 Kbytes) at maximum becomes unnecessary.

Furthermore, in each Embodiment, the recording medium was assumed to be a phase change optical disc (phase change optical disc 131), but is not particularly limited to this, and may be: recording media having disc shapes such as optical discs and hard discs, the optical discs being, e.g., DVD-RAM, MO (magneto-optical disc), DVD-R, DVD-RW, DVD+RW, CD-R and CD-RW; magnetic tapes; and semiconductor memories such as flash memories.

As described in the foregoing, according to the present invention, insertion of transport packets for padding is completely unnecessary in the case where a mid-stream of a file is deleted by an editing process, with the remaining portions being combined, whereby it becomes possible to utilize a limited recording space effectively.

The invention claimed is:

1. An information recording apparatus comprising:
a recording control section recording, in a packet format of a fixed length that is not in an integral multiple relationship with a data size of a logical block of a recording medium, an input data stream in the recording medium as a first file; and
an editing control section dividing the first file at two points ending a packet and starting another packet and combining a portion preceding the first point ending the packet and a portion following the second point starting the another packet without including a portion between the two points;
wherein the editing control section records a second file including a portion from a head of the first file to the first point ending the packet, a third file including a portion from the second point starting the another packet to a third point ending a logical block and a fourth file including a rest of the packet in the first file in the recording medium; and records a relation information file containing information on a relation between the second file, the third file and the fourth file in the recording medium.

2. The information recording apparatus according to claim 1, wherein the information on a relation is information on a sequence between the second file, the third file and the fourth file.

3. The information recording apparatus according to claim 1, wherein the editing control section records information indicating file names and starting logical blocks of the second file, the third file, the fourth file and the relation information file altogether in the recording medium.

4. An information reproduction apparatus comprising:
a reproduction section reading out a first file, a second file and a third file from a recording medium in which a data stream configured by packets of a fixed length that is not in an integral multiple relationship with a data size of a logical block of the recording medium is divided at two points ending a packet and starting another packet and recorded as the first file including a portion from a head to the first point ending the packet, the second file including a portion from the second point starting the another packet to a third point ending a logical block and the third file including a rest of the packet of the data stream and a relation information file containing information on a relation between the first file, the second file and the third file is recorded, and reproducing the data stream; and
a reproduction control section controlling the reproduction section for reproducing the data stream with reference to the relation information file;
wherein the reproduction control section finds out a file in which targeted data are stored and a position at which the targeted data are stored with reference to the relation information file, a data size of the first file, a data size of the second file or a data size of the third file; and reads out the targeted data.

5. An information recording method, comprising:
a step of recording, in a packet format of a fixed length that is not in an integral multiple relationship with a data size of a logical block of a recording medium, an input data stream in the recording medium as a first file, dividing the first file at two points ending a packet and starting another packet and combining a portion preceding the first point ending the packet and a portion following the second point starting the another packet without including a portion between the two points so as to be recorded in the recording medium, wherein the step of recording includes:
a first step of recording a second file including a portion from a head of the first file to the first point ending the packet, a third file including a portion from the second point starting the another packet to a third point ending a logical block and a fourth file including a rest of the packet in the first file in the recording medium; and
a second step of recording a relation information file containing information on a relation between the second file, the third file and the fourth file in the recording medium.

6. The information recording method according to claim 5, wherein the information on a relation is information on a sequence between the second file, the third file and the fourth file.

7. The information recording method according to claim 5, wherein in the second step, information indicating file names and starting logical blocks of the second file, the third file, the fourth file and the relation information file is recorded altogether in the recording medium.

8. An information reproduction method, comprising:
a step of reproducing a data stream from a recording medium in which a data stream configured by packets of a fixed length that is not in an integral multiple relationship with a data size of a logical block of the recording medium is divided at two points ending a packet and starting another packet and recorded as a first file including a portion from a head to the first point ending the packet, a second file including a portion from the second point starting the another packet to a third point ending a logical block and a third file including a rest of the packets of the data stream and a relation information file containing information on a relation between the first file, the second file and the third file is recorded, wherein the step of reproducing includes:
a first step of reading out the first file, the second file and the third file from the recording medium so as to reproduce the data stream; and a second step of reproducing the data stream with reference to information on a relation recorded in the relation information file.

9. An information recording apparatus comprising:
a recording control section recording, in a packet format of a fixed length that is not in an integral multiple relationship with a data size of a logical block of a recording medium, an input data stream in the recording medium as a first file; and
an editing control section dividing the first file at two points ending a packet and starting another packet and combining a portion preceding the first point ending the packet and a portion following the second point starting the another packet without including a portion between the two points;
wherein the editing control section records a second file including a portion from a head of the first file to the first point ending the packet and a third file including a portion following the second point starting the another packet; and records a relation
information file containing information on a relation between the second file and the third file in the recording medium, and
the editing control portion adds and places an integral number of the packets in total to a tail of the second file and a head of the third file.

10. The information recording apparatus according to claim 9, wherein the information on a relation is information on a sequence between the second file and the third file.

11. The information recording apparatus according to claim 9, wherein the editing control section records information indicating file names and starting logical blocks of the second file, the third file and the relation information file altogether.

12. An information reproduction apparatus comprising:
a reproduction section reading out a first file and a second file from a recording medium in which a data stream configured by packets of a fixed length that is not in an integral multiple relationship with a data size of a logical block of the recording medium is divided at two points ending a packet and starting another packet and recorded as the first file including a portion from a head to the first point ending the packet and the second file including a portion following the second point starting the another packet, an integral number of the packets in total are added and recorded to a tail of the first file and a head of the second file and further a relation information file containing information on a relation between the first file and the second file is recorded, and reproducing the data stream; and
a reproduction control section controlling the reproduction section for reproducing the data stream with reference to the relation information file;
wherein the reproduction control section finds out a file in which targeted data are stored and a position at which the targeted data are stored with reference to the relation information file, a data size of the first file or a data size of the second file; and reads out the targeted data.

13. An information recording method, comprising:
a step of recording, in a packet format of a fixed length that is not in an integral multiple relationship with a data size of a logical block of a recording medium, an input data stream in the recording medium as a first file, dividing the first file at two points ending a packet and starting another packet and combining a portion preceding the first point ending the packet and a portion following the second point starting the another packet without including a portion between the two points so as to be recorded in the recording medium, wherein the step of recording includes:
a first step of recording a second file including a portion from a head of the first file to the first point ending the packet and a third file including a portion following the second point starting the another packet in the recording medium; and
a second step of recording a relation information file containing information on a relation between the second file and the third file in the recording medium;
wherein in the first step, an integral number of the packets in total are added and placed to a tail of the second file and a head of the third file.

14. The information recording method according to claim 13, wherein the information on a relation is information on a sequence between the second file and the third file.

15. The information recording method according to claim 13, wherein in the second step, information indicating file names and starting logical blocks of the second file, the third file and the relation information file is recorded altogether in the recording medium.

16. An information reproduction method, comprising:
a step of reproducing information from a recording medium in which a data stream configured by packets of a fixed length that is not in an integral multiple relationship with a data size of a logical block of the recording medium is divided at two points ending a packet and starting another packet and recorded as a first file including a portion from a head to the first point ending the packet and a second file including a portion following the second point starting the another packet, an integral number of the packets in total are added and recorded to a tail of the first file and a head of the second file and further a relation information file containing information on a relation between the first file and the second file is recorded, wherein the step of reproducing includes:
reading out the first file and the second file so as to reproduce the data stream; and
reproducing the data stream with reference to the information on a relation recorded in the relation information file.

* * * * *